May 13, 1924.

L. M. DIETERICH

GASKET CONSTRUCTION

Filed Nov. 12, 1921

1,493,615

Ludwig M. Dieterich INVENTOR

BY Emery, Varney, Blair Hoquet

ATTORNEYS

Patented May 13, 1924.

1,493,615

UNITED STATES PATENT OFFICE.

LUDWIG M. DIETERICH, OF NEW DORP, NEW YORK.

GASKET CONSTRUCTION.

Application filed November 12, 1921. Serial No. 514,646.

*To all whom it may concern:*

Be it known that I, LUDWIG M. DIETERICH, a citizen of the United States, and a resident of New Dorp, Staten Island, county of Richmond, and State of New York, have invented an Improvement in Gasket Constructions, of which the following is a specification.

This invention relates to packing and with regard to its more specific features to the packing and sealing of joints as by gaskets, in pump valves and the like. One of the objects thereof is to provide a device of the above general nature of simple and practical construction and thoroughly efficient and dependable action. Another object is to provide a device of the above general nature, which is well adapted to withstand hard practical use and maintain its efficiency under such conditions. Other objects are to provide devices of the above general nature, of low cost and adapted for rapid manufacture. Other objects will be in part obvious and in part pointed out hereafter.

The invention accordingly consists in the features of construction, combinations of elements and arrangements of parts, all as will be illustratively hereinafter described and the scope of the application of each of which will be indicated in the following claims.

In the accompanying drawings in which are shown several of various possible embodiments of this invention, Fig. 1 is a plan view of the gasket or the like.

Similar reference characters refer to similar parts throughout the views of the drawings.

Figure 1:
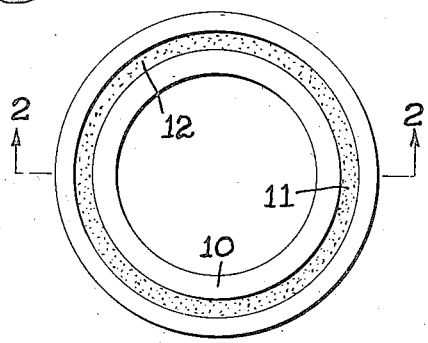
Figure 2:
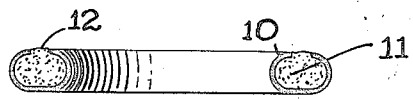
Fig. 2 is a sectional view taken on the line 2—2 of Fig. 1.

Referring now to the gasket shown in Fig. 1 of the drawings, there is shown an outer member or shell 10, which may be of copper or the like. This member 10 is of annular shape, having a cross-section substantially as shown in Fig. 2, and within the member 10 is a filler 11, preferably of cork. This filler not only occupies the space within member 10 but is exposed as at 12 to provide a sealing surface. The cork may be solid or may be of granular form covered by an elastic binder. In either event it is subjected to an extreme pressure in the direction of the pressure to which it would be subjected in use in the embodiments under consideration. This pressure is in the general direction of the axis of the annulus which the gasket forms. The first mentioned pressure may be applied either before or after the cork is assembled in the shell 10 and is of such a nature as to permanently reduce the aggregate volume of the cork. In other words, the cork is given a permanent set in the above direction by the application of extreme pressure. In this manner its cells are somewhat flattened and its resilience and elasticity in the said direction are greatly increased. It is to be understood that although preferably cork is employed, nevertheless certain of the broader features of this invention may be obtained with the use of other similar material. As an example of another material having similar structure and the cells of which may be flattened as above described to impart to the material a relatively great degree of resilience may be mentioned, for example, balsa wood. This wood is found in a tree of the mallow family and under treatment as above described the above-mentioned desirable characteristics may be imparted to it. Cork, however, is most easily obtainable and, moreover, gives excellent results when treated as above described.

In the use of the above described gasket it is subjected, as a whole, to pressure in the direction above described, the annulus being clamped between two opposing surfaces. This pressure causes a flattening of the annulus to some extent but the resilient action of the cork holds the contact surfaces in engagement. The exposed surface of the cork as at 12 forms a tight joint. When the pressure is removed, the distance between the opposing compressing surfaces is increased and the cork quickly expands to follow up such movement. It is to be especially noted that even under a high degree of temperature this resilience is maintained and that the device, as a whole, resists the action of oil, water and various other liquids or gases with which it may come in contact in use.

Figure 3:
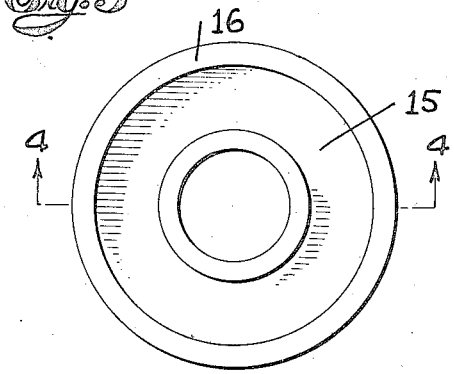
Fig. 3 is a plan of another device.

In Fig. 3 of the drawings there is shown a circular valve disc or the like having an annular metallic casing 13 with the filler 14 of cork or the like as hereinbefore described. The shape of the shell in this figure is somewhat different from that before described and the upper surface of the cork member 14 is covered by a flat annular disc 15 over which the shell is flanged as at 16.

Figure 5:
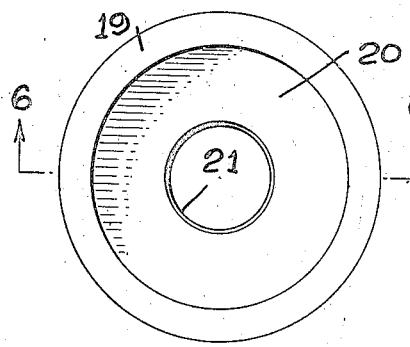
Fig. 5 is a plan of another device.

In the embodiment shown in Fig. 5 of the drawings, the shell comprises three parts. There is first an annular member 17 provided with an upright flange 18, which is in turn inwardly flanged as at 19. Beneath the flange 19 is a flat disc 20 and the wall of the annulus is supported by a short sleeve 21. These parts are all of sheet metal and form a casing enclosing the filler 22 which is of the nature above described.

Figure 7:
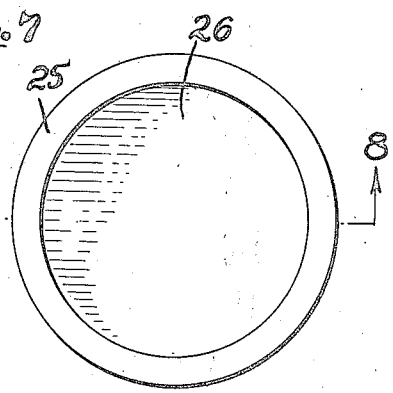
Fig. 7 is a plan of another device.
Figure 6:
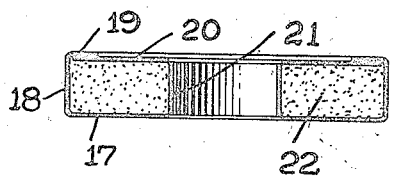
Fig. 6 is a section taken on the line 6—6 of Fig. 5.
Figure 8:
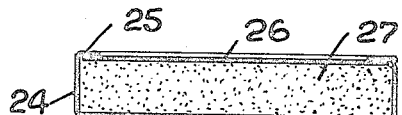
Fig. 8 is a section taken on line 8—8 of Fig. 7.

In Fig. 7 of the drawings is shown a flat pump valve gasket of circular instead of annular form. The casing of this valve includes the metal member 23, having an upright wall 24 inwardly flanged as at 25. Underneath this flange is fitted a flat disc 26 and inside the case thus formed is a circular body of the above filler material 27.

Figure 4:
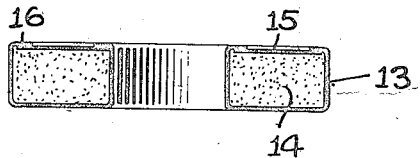
Fig. 4 is a sectional view taken on line 4—4 of Fig. 3.

The method of use of the various devices above described will be understood from the description of that given of the embodiment shown in Figure 1. It may be pointed out, however, that in these latter forms the casing parts are not secured together by joints. For example, the disc 15 in the Fig. 4 embodiment can move downwardly with respect to flange 16. This action permits a free compression of the filler 14, when, for example the exposed surface 15 contacts the compressing surface.

It may be noted generally that, where the cork filler member or material, being normally substantially unyielding or non-resilient, is compressed to a substantial degree either prior to the insertion in the metallic protective casing or as it is inserted therein, a highly advantageous resilient or yielding capacity with a strong reaction to further pressure or compression is imparted to it, and by the unmodified term "compressed" is meant such a substantial degree of pressure. If this pressure is carried further to such extent as to permanently reduce the volume of the cork as hereinbefore explained, the above desirable qualities will be much enhanced, although distinct advantages are attained with a lesser but substantial degree of compression as above set forth.

It will thus be seen that there has been provided in this invention a packing or gasket device in which the several objects of this invention as well as many advantages are successfully achieved, and it may further be noted that there has been provided a sealing device of thoroughly dependable and reliable action and one which is well adapted to meet the conditions of hard practical use.

As various possible embodiments may be made of the above invention and as many changes might be made in the embodiments above set forth, it is to be understood that all matter hereinabove set forth or shown in the accompanying drawings is to be interpreted as illustrative and not in a limiting sense.

What I claim is:

1. In a device for packing and the like in combination, a compressed cork member and an outer encasing member within which said first member is mounted.

2. In a device for packing and the like in combination, a cork member of a total width substantially in excess of its length, said member having been compressed to a permanently reduced volume and protective means arranged on said cork member.

3. In a device for packing and the like in combination, a cork member of a total width substantially in excess of its length, said member having been compressed to a permanently reduced volume and protective means arranged on said cork member, said protective means substantially enclosing said first member.

4. In a device for packing and the like in combination, a member formed of a normally substantially unyielding substance which, when compressed to a permanently reduced volume, becomes yielding, and an outer metallic casing substantially enclosing said member and shaped to permit compression in a direction transverse to its plane.

5. In a device for packing and the like in combination, a circular member formed of compressed cork and an outer metallic casing fitting and substantially enclosing the same and shaped to permit compression of said cork in a direction transverse to its plane.

6. In a device for packing and the like in combination, a member formed of a normally substantially unyielding vegetable material which, when compressed to a permanently reduced volume, becomes yielding, and an outer metallic casing substantially enclosing said member and shaped to permit compression in a direction transverse to its plane.

7. In a device for packing and the like in combination, a protective casing adapted to permit compression in a direction transverse to its plane between two opposed surfaces and having an opening at an end thereof toward one of said surfaces and a member within said casing formed of a normally substantially unyielding substance which, when compressed to a permanently reduced volume, becomes yielding, said opening in said casing permitting exposure of said member to said one of said opposed surfaces.

8. In a device for packing and the like in combination, an annular member formed of a normally substantially unyielding substance which, when compressed to a permanently reduced volume, becomes yielding, and protective means for substantially encasing said member formed to permit compression in a direction transverse to its plane between two opposed surfaces, said protective means having an annular opening at an end thereof adjacent to one of said surfaces, thereby to permit exposure to said one of said surfaces of said member.

In testimony whereof, I have signed my name to this specification this 3rd day of November, 1921.

LUDWIG M. DIETERICH.